US009319235B2

(12) United States Patent
Kilfoyle et al.

(10) Patent No.: US 9,319,235 B2
(45) Date of Patent: *Apr. 19, 2016

(54) AUTHENTICATION, AUTHORIZATION, AND ACCOUNTING BASED ON AN AUTOMATICALLY GENERATED USERNAME

(75) Inventors: Robert Greg Kilfoyle, Campbell, CA (US); Brian S. Wilkerson, Aptos, CA (US)

(73) Assignee: ERICSSON AB, Stockholm (SE)

( * ) Notice: Subject to any disclaimer, the term of this patent is extended or adjusted under 35 U.S.C. 154(b) by 1005 days.

This patent is subject to a terminal disclaimer.

(21) Appl. No.: 13/032,624

(22) Filed: Feb. 22, 2011

(65) Prior Publication Data
US 2011/0145379 A1 Jun. 16, 2011

Related U.S. Application Data

(63) Continuation of application No. 10/133,072, filed on Apr. 26, 2002, now Pat. No. 7,895,304.

(51) Int. Cl.
*G06F 15/177* (2006.01)
*H04L 12/28* (2006.01)
*H04L 29/12* (2006.01)

(52) U.S. Cl.
CPC ........ *H04L 12/2872* (2013.01); *H04L 12/2876* (2013.01); *H04L 12/2801* (2013.01); *H04L 29/12226* (2013.01); *H04L 61/2015* (2013.01)

(58) Field of Classification Search
CPC ............ H04L 12/2801; H04L 12/2872; H04L 12/2876; H04L 29/12226; H04L 61/2015
USPC ........................................................ 709/223
See application file for complete search history.

(56) References Cited

U.S. PATENT DOCUMENTS

| 5,610,910 A | 3/1997 | Focsaneanu et al. |
| 6,073,178 A | 6/2000 | Wong et al. |

(Continued)

FOREIGN PATENT DOCUMENTS

| EP | 2615788 A1 | 7/2013 |
| EP | 2 854 343 A1 | 4/2015 |

(Continued)

OTHER PUBLICATIONS

Ethers(5) Man Page. FreeBSD File Formats Manual, FreeBSD 9.2. Apr. 12, 1995. <http://www.freebsd.org/cgi/man.cgi?query=ethers&apropos=0&sektion=5&manpath=FreeBSD+10.0-RELEASE&arch=default&format=ascii>. 1 page.*
"Hexadecimal and Binary Numbering and IP Addressing". Cisco Press. Mar. 3, 1999. <http://www.cisco.com/cpress/cc/td/cpress/fund/primer/cb0708.htm>. pp. 1-11.*

(Continued)

*Primary Examiner* — Christopher Biagini
(74) *Attorney, Agent, or Firm* — Nicholson De Vos Webster & Elliott LLP

(57) ABSTRACT

In one embodiment, a method comprises receiving a request from a computing device for an address. The request is to include a unique value associated with the computing device. The method also comprises generating a username based on the unique value. The username is associated with the computing device. Additionally, the username is bound to a context within a network element. The method also comprises assigning an address to the computing device within the context. A circuit is generated between the computing device and the network element based on the address.

56 Claims, 7 Drawing Sheets

(56) References Cited

U.S. PATENT DOCUMENTS

| | | | |
|---|---|---|---|
| 6,078,568 | A | 6/2000 | Wright et al. |
| 6,098,116 | A | 8/2000 | Nixon et al. |
| 6,112,246 | A | 8/2000 | Horbal et al. |
| 6,317,830 | B1 | 11/2001 | Stolz |
| 6,339,830 | B1 | 1/2002 | See et al. |
| 6,359,890 | B1 | 3/2002 | Shoho et al. |
| 6,370,122 | B1 | 4/2002 | Nussbaumer et al. |
| 6,473,411 | B1 | 10/2002 | Kumaki et al. |
| 6,603,758 | B1* | 8/2003 | Schmuelling et al. ......... 370/352 |
| 6,609,153 | B1 | 8/2003 | Salkewicz |
| 6,618,858 | B1* | 9/2003 | Gautier ......................... 725/132 |
| 6,912,567 | B1* | 6/2005 | Allard et al. ................... 709/223 |
| 7,895,304 | B1 | 2/2011 | Kilfoyle et al. |
| 8,321,550 | B2 | 11/2012 | Kilfoyle et al. |
| 8,681,695 | B1 | 3/2014 | Krishnan |
| 2001/0019559 | A1* | 9/2001 | Handler et al. ................ 370/468 |
| 2002/0114274 | A1 | 8/2002 | Sturges et al. |
| 2003/0005100 | A1 | 1/2003 | Barnard et al. |
| 2003/0145075 | A1 | 7/2003 | Weaver et al. |
| 2004/0031030 | A1* | 2/2004 | Kidder et al. ................. 717/172 |
| 2004/0131078 | A1 | 7/2004 | Gupta et al. |
| 2004/0218580 | A1 | 11/2004 | Bahl et al. |
| 2006/0098669 | A1 | 5/2006 | Enns et al. |
| 2008/0201765 | A1 | 8/2008 | Walter et al. |
| 2011/0145379 | A1 | 6/2011 | Kilfoyle et al. |
| 2013/0086634 | A1 | 4/2013 | Dee et al. |

FOREIGN PATENT DOCUMENTS

| | | |
|---|---|---|
| JP | 10210066 A | 8/1998 |
| JP | 11355303 | 12/1999 |
| JP | 2000209268 | 7/2000 |
| JP | 2001156846 | 6/2001 |
| JP | 2001339437 | 12/2001 |
| JP | 2001350937 | 12/2001 |
| WO | WO-99/27693 A2 | 6/1999 |
| WO | WO-01/19080 A2 | 3/2001 |
| WO | WO-03/091963 A2 | 11/2003 |
| WO | WO-03/091963 A3 | 11/2003 |

OTHER PUBLICATIONS

"Address Resolution Protocol," 5 pages, retrieved from the internet on Mar. 8, 2007, Wikipedia, http://en.wikipedia.org/wiki/Address_Resolution_Protocol.
ARP—Q&A, Feb. 17, 1999, 6 pages, http://www.geocities.com/SiliconValley/Vista/8672/network/arp.html?20078.
MAC address, 4 pages, retrieved from the internet on Mar. 8, 2007, Wikipedia, http://en.wikipedia.org/wiki/MAC_address.
OSI model, 6 pages, retrieved from the internet on Mar. 8, 2007, Wikipedia, http://en.wikipedia.org/wiki/Seven-layer_OSI_model.
Foreign counterpart Supplementary Search Report, European Application No. 03726459.5, mailed Apr. 29, 2010, 3 pages.
"Welcome to the DHCP Reading Room!," pp. 1-2, downloaded from http://www.ehsco.com/reading/dhcp.html on Mar. 8, 2007.
"Technology Brief, Clientless IP Service Selection," 2003, pp. 1-8, Redback Networks Inc.
International Search Report, Application No. PCT/US03/12862, dated Oct. 17, 2003, 5 pages.
International Preliminary Examination Report, Application No. PCT/US03/12862, dated Sep. 15, 2005, 4 pages.
Notice of the Reason for Refusal, Application No. 2010-067983, dated May 6, 2011, 4 pages.
Communication pursuant to Article 94(3) EPC, European Application No. 03726459.5, dated Jun. 14, 2011, 6 pages.
Non-Final Office Action, U.S. Appl. No. 10/133,072, Jun. 20, 2008, 14 pages.
Non-Final Office Action, U.S. Appl. No. 10/133,072, Dec. 16, 2008, 16 pages.
Notice of Allowance, U.S. Appl. No. 10/133,072, Oct. 15, 2010, 10 pages.
Non-Final Office Action, U.S. Appl. No. 10/133,072, Mar. 22, 2007, 16 pages.
Final Office Action, U.S. Appl. No. 10/133,072, Oct. 5, 2007, 28 pages.
Final Office Action, U.S. Appl. No. 10/133,072, Mar. 1, 2010, 16 pages.
Non-Final Office Action, U.S. Appl. No. 10/133,072, Jul. 7, 2009, 17 pages.
Foreign Office Action from Counterpart Japanese Patent Application No. 2004-500262, mailed Jul. 29, 2008, 6 pages.
Foreign Office Action from Counterpart Japanese Patent Application No. 2004-500262, mailed Apr. 21, 2009, 5 pages.
Foreign Office Action from Counterpart Japanese Patent Application No. 2004-500262, mailed Nov. 24, 2009, 6 pages.
Non-Final Office Action, U.S. Appl. No. 12/580,215, Jan. 4, 2012, 13 pages.
Communication pursuant to Article 94(3) EPC, European Application No. 03726459.5, dated Feb. 23, 2012, 5 pages.
D.E. Comer, "Internetworking with TCP/IP vol. 1: Principles, Protocols and Architecture," Fourth Edition, Chapter 2, pp. 17-52, Prentice Hall, 2000.
R. Droms, "Dynamic Host Configuration Protocol," Oct. 1993, pp. 1-39, Network Working Group RFC 1541.
Eric A. Hall, "How DHCP Works," May 15, 1996, http://www.ehsco.com/reading/19960515ncw3.html.
John Wobus, "DHCP FAQ," Jun. 20, 1996, http://ns.uoregon.edu/dhcp/faq.html.
Notice of Allowance, U.S. Appl. No. 12/580,215, dated Jul. 27, 2012, 16 pages.
Non-Final Office Action, U.S. Appl. No. 12/580,215, dated Apr. 16, 2012, 7 pages.
Notice of Allowance, Application No. 2010-067983, dated Oct. 9, 2012, 2 pages.
Decision to Grant, EP Application No. 03726459.5, dated Jul. 10, 2014, 2 pages.
Extended European Search Report, EP Application No. 14173768.4, dated Feb. 27, 2015, 4 pages.
EP Application No. 14173768.4, Intention to Grant, dated May 4, 2015, 6 pages.
JP Application No. 2004-500262, Notice of Allowance, dated Jul. 16, 2010, 2 pages.
PCT Application No. PCT/IB2015/050968, PCT Notification of Transmittal of the International Search Report and the Written Opinion of the International Searching Authority, mailed May 4, 2015, 9 pages.
PCT Application No. PCT/IB2015/051287, PCT Notification of Transmittal of the International Search Report and the Written Opinion of the International Searching Authority, mailed May 4, 2015, 10 pages.
RFC 2131: Droms, "Dynamic Host Configuration Protocol," Internet Engineering Taskforce, Network Working Group, Request for Comments, Mar. 1997, 45 pages.
RFC 3315: Droms, et al., "Dynamic Host Configuration Protocol for IPv6 (DHCPv6)," The Internet Society, Network Working Group, Request for Comments, Jul. 2003, 101 pages.
RFC 3633: Troan, et al., "IPv6 Prefix Options for Dynamic Host Configuration Protocol (DHCP) version 6," The Internet Society, Network Working Group, Request for Comments, Dec. 2003, 101 pages.
RFC 4862: Thomson, et al., "IPv6 Stateless Address Autoconfiguration," Internet Engineering Taskforce, Network Working Group, Request for Comments, Sep. 2007, 30 pages.
Non-Final Office Action from counterpart U.S. Appl. No. 14/244,723, mailed Oct. 8, 2015, 20 pages.
Certificate of Grant of Standard Patent for Hong Kong Patent Application No. 05106021.5, mailed Jan. 16, 2015, 3 pages.
Marc Bernstein, "Understanding PPPoE and DHCP", White Paper by Juniper Networks, May 2006, pp. 1-15.
Rigney et al., "Remote Authentication Dial in User Service (RADIUS)", Network Working Group, Request for Comments: 2865, pp. 1-76, Jun. 2000.
"IEEE Standard for Local and Metropolitan Area Networks: Overview and Architecture", IEEE Std 802-2001, IEEE Computer Society, Mar. 8, 2002, 46 pages.

* cited by examiner

AUTHENTICATION, AUTHORIZATION, AND ACCOUNTING BASED ON AN AUTOMATICALLY GENERATED USERNAME

CROSS REFERENCE TO RELATED APPLICATIONS

This application is a continuation of U.S. patent application Ser. No. 10/133,072, entitled "Subscriber Service Selection Over Non-Channelized Media", filed on Apr. 26, 2002, which is incorporated by reference in its entirety.

FIELD OF THE INVENTION

The invention relates to the field of communications. More specifically, the invention relates to subscriber service selection over non-channelized media.

BACKGROUND OF THE INVENTION

In the field of communications, the need for high-speed transmission of data including video and audio has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a Plain Old Telephone Service (POTS) line. Other choices for connection, which are at higher speeds, into a network can include Integrated Services Digital Network (ISDN), Digital Subscriber Line (DSL) service (both using a POTS line), and cable modem service over a Radio Frequency (RF) cable line.

Current approaches for network connectivity for certain connection services (including cable modem service) are such that a group of subscribers are pooled together and treated as an individual entity. Such an approach does not allow for individualized accounting and/or usage tracking for different subscribers connecting to the network. In contrast, other techniques (including DSL service) do allow for individualized treatment of subscribers. Disadvantageously, these techniques require specialized software and/or hardware to be executing on the individual subscriber/client machines to allow for this individualized approach. In particular, DSL service provides for this individualized treatment by using software and/or hardware that allows for the Point-to-Point Protocol over Ethernet (PPPoE) protocol. Accordingly, the costs of such services are increased to account for this additional software and/or hardware.

SUMMARY OF THE INVENTION

A method and apparatus for enabling subscriber service selection over non-channelized media are described. In one embodiment, a method comprises receiving a request from a computing device for an address. The request is to include a unique value associated with the computing device. The method also comprises generating a username based on the unique value. The username is associated with the computing device. Additionally, the username is bound to a context within a network element. In an embodiment, the username is used to select a context (service). The method also comprises assigning an address to the computing device within the context. A circuit is generated between the computing device and the network element based on the address.

In an embodiment, a method includes receiving a request from a subscriber device for a source address for communications in a network. The request is to include an identification of the subscriber device. Additionally, the method includes converting the identification of the subscriber device from a decimal value to a number of text characters. The method also comprises assigning a source address to the subscriber device based on the converted identification.

In one embodiment, an apparatus comprises a memory to store a number of source addresses for a context. The apparatus also comprises a control engine coupled to the memory. The control engine is to generate a subscriber identifier based on an identification of a computing device coupled to the apparatus. The control engine is to assign one of the number of source addresses to the computing device based on the context of the subscriber identifier.

In an embodiment, a network element comprises a traffic card that includes a port for receiving data from a client device. The traffic card is to receive a request for a source address on the port. The request includes an identification of the client device. The network element also includes a control card coupled to the traffic card. The control card comprises a control engine. The control engine is to generate a subscriber identifier based on the identification of the client device. The control engine is to assign a source address to the client device based on the subscriber identifier.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1A. However, element numbers are the same for those elements that are the same across different Figures. In the drawings.

DETAILED DESCRIPTION

Figure 1A:
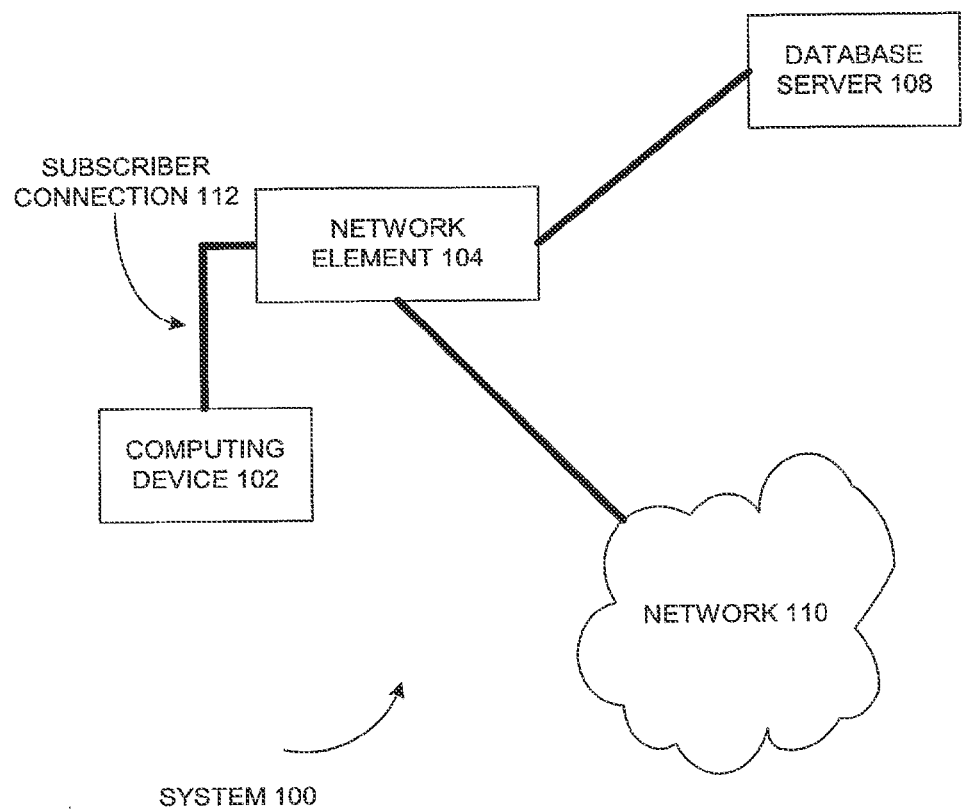
FIGS. 1A-1C illustrate systems for enabling subscriber service selection over non-channelized media, according to one embodiment of the invention.

A method and apparatus for enabling subscriber service selection over non-channelized media are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Embodiments of the invention enable subscriber service selection over non-channelized media. In an embodiment, subscribers coupled to a network are identified individually based on an identification of the client device, such as the Media Access Control (MAC) address of the networking card within the client device. As will be described in more detail below, this identification is converted into a username that is unique to the subscriber such that the subscriber can be assigned a source address that is associated with this username. Accordingly, subscribers can be individually identified to allow for individualized treatment, including rate limiting, policing values and access control lists on a per subscriber basis. Moreover, such treatment is independent of the need to include specific hardware and/or software on the client machine.

Figure 3:
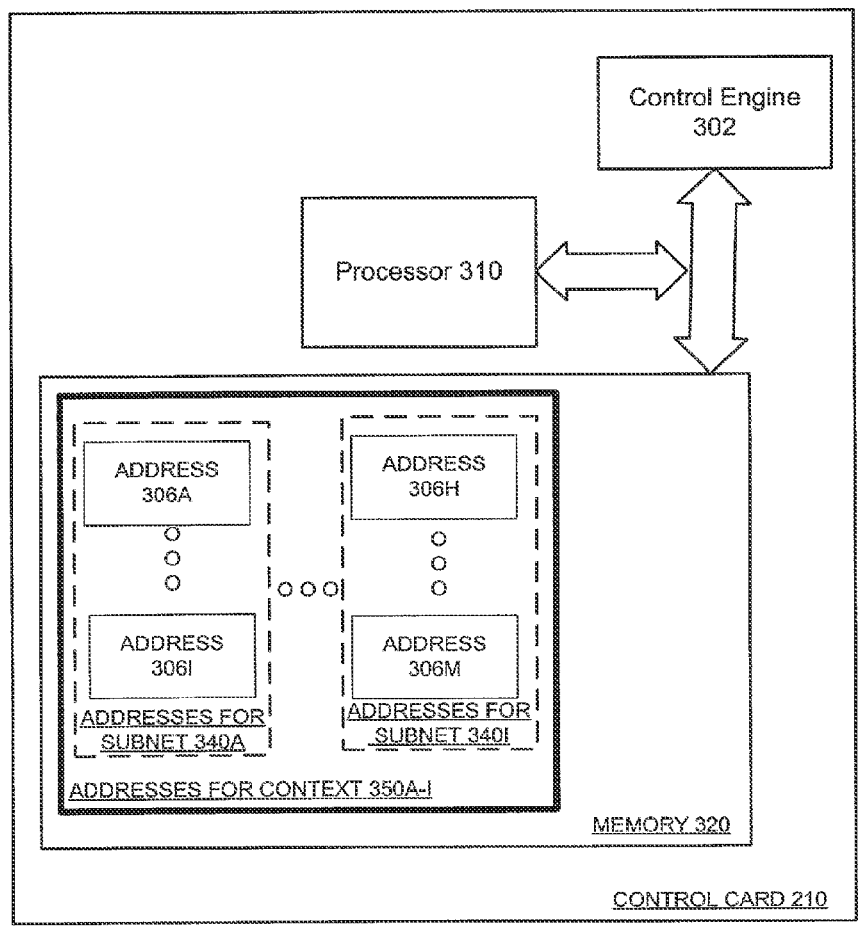
FIG. 3 illustrates a more detailed block diagram of a control card within a network element, according to one embodiment of the invention.
Figure 4:
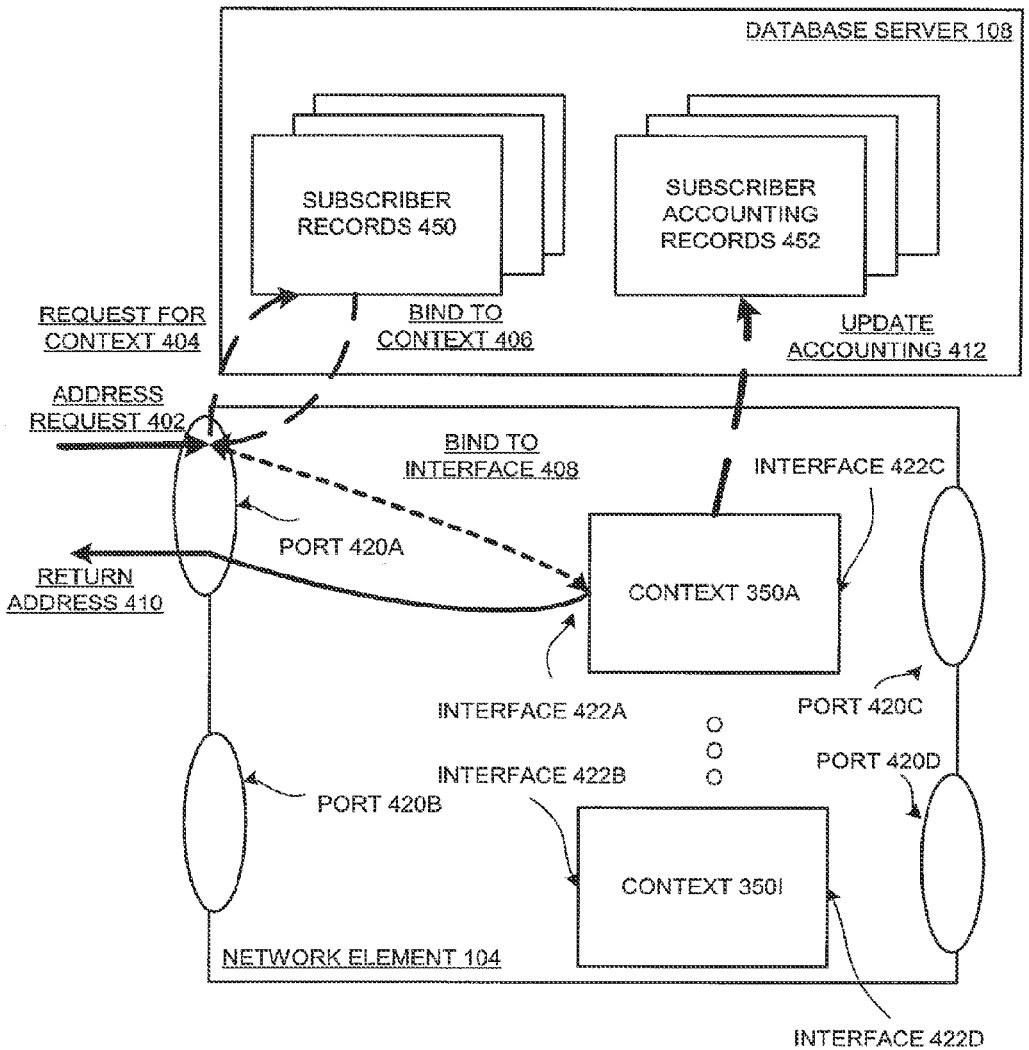
FIG. 4 illustrates a more detailed block diagram of a network element, database server and operations and communications therewith, according to one embodiment of the invention.
Figure 5:
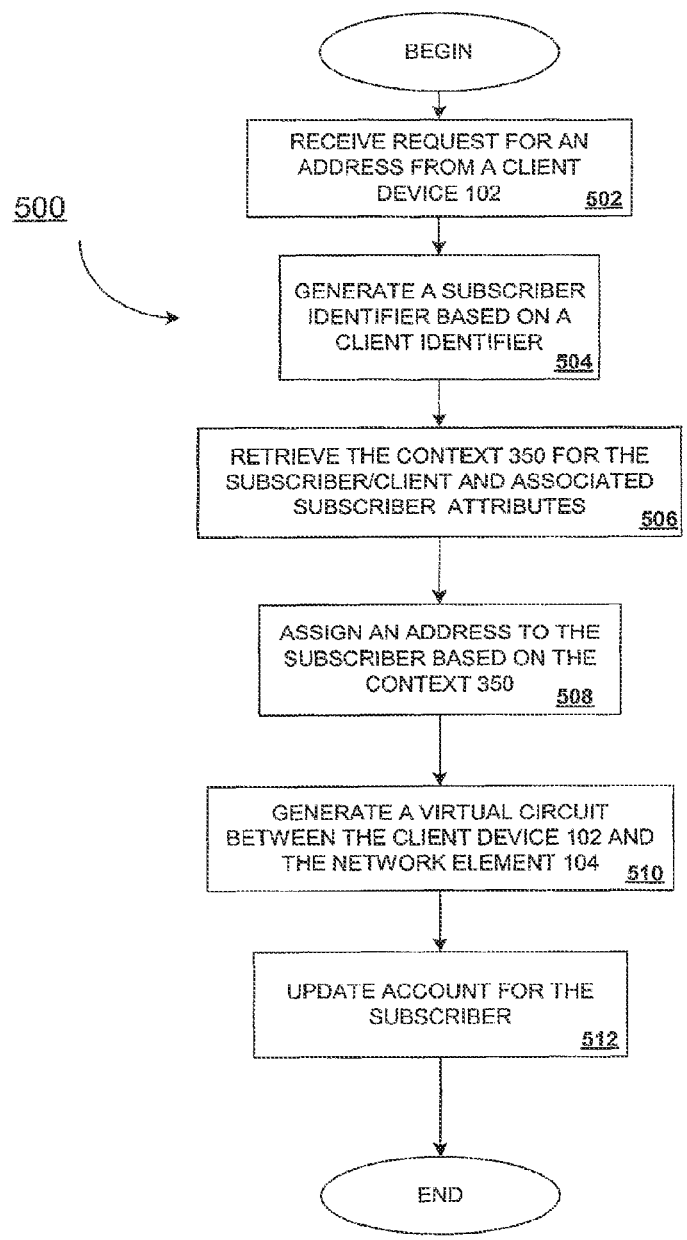
FIG. 5 is a flow diagram for providing subscriber service selection over a non-channelized media, according to one embodiment of the invention.

FIGS. 1-4 show block diagrams of systems for enabling subscriber service selection over non-channelized media, in accordance with embodiments of the invention. FIG. 5 shows a flow diagram illustrating operations for enabling subscriber service selection over non-channelized media, according to embodiments of the invention. The operations of the flow diagram will be described with references to the systems shown in the block diagrams. However, it should be understood that the operations of the flow diagram could be performed by embodiments of systems other than those discussed with reference to the block diagrams, and embodiments discussed with reference to the systems could perform operations different than those discussed with reference to the flow diagram.

Figure 1B:
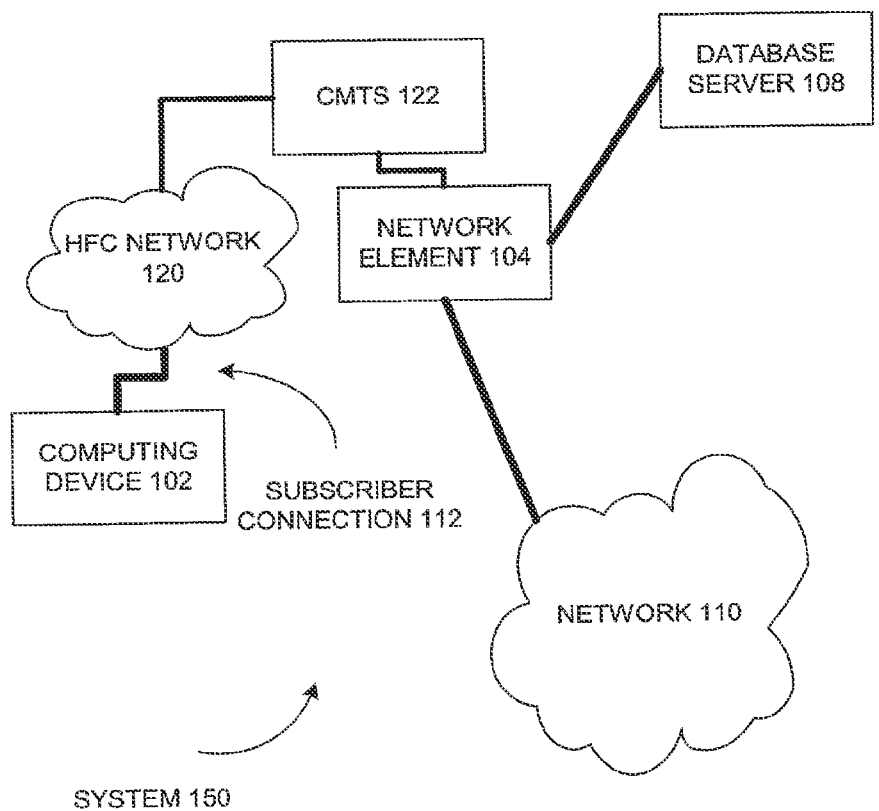
Figure 1C:
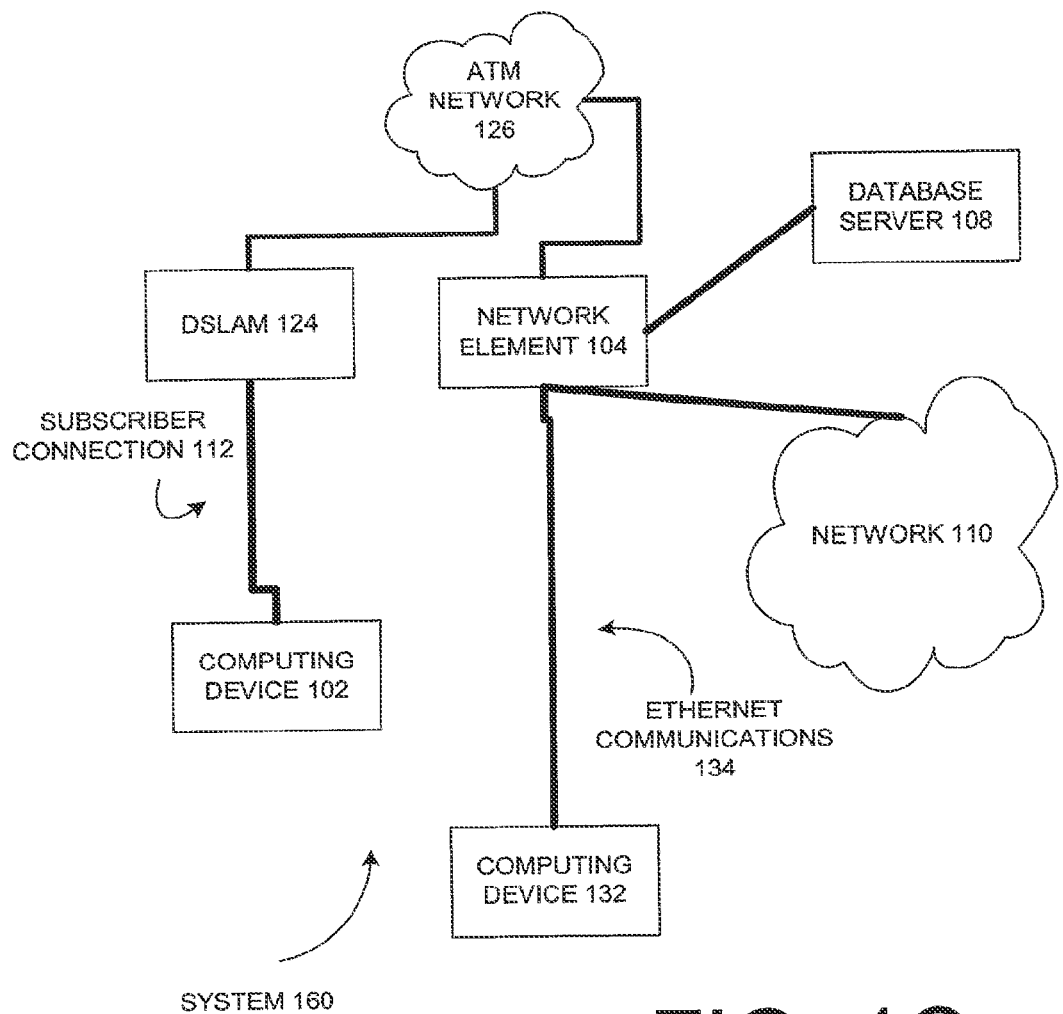

FIGS. 1A-1C illustrate systems for enabling subscriber service selection over non-channelized media, according to one embodiment of the invention. As will be described in more detail below, a system 100 of FIG. 1A illustrates a system of communications that can be based on a number of protocols and configurations, while a system 150 of FIG. 1B and a system 160 of FIG. 1C illustrate systems of communications based on specific types of protocols and configurations. In particular, the system 150 of FIG. 1B illustrates a system of communications based on a cable infrastructure, while the system 160 of FIG. 1C illustrates a system of communications based on an infrastructure that employs DSL/Asynchronous Transfer Mode (ATM) and Ethernet. These systems are by way of example and not by way of limitation, as other systems based on other types of protocols and having other types of configurations can incorporate embodiments of the invention. For example, embodiments of the inventions can be incorporated into a wireless infrastructure, wherein wireless concentrators can route data from client devices into the network elements described herein.

With regard to FIG. 1A, a system 100 comprises a computing device 102, a network element 104, a database server 108 and a network 110. As shown, the computing device 102 is coupled to the network element 104 through a subscriber connection 112. The network element 104 is also coupled to the database server 108 and the network 110. In an embodiment, the network element 104 is coupled to the database server 108 through the network 110. In another embodiment, the network element 104 is coupled to the database server 108 through a network that is separate from the network 110.

In one embodiment, the network 110 is a local area network (LAN). In an embodiment, the network 110 is a wide area network (WAN). Further, the network 110 may be a combination of different networks that couple the network element 104 to other computing devices and network elements coupled thereto. In an embodiment, the network element 104 is coupled to receive data from client device 102 over non-channelized media.

In one embodiment, the database server 108 stores data for a number of subscribers and their associated subscriber connections. In an embodiment, the database server 108 stores data related to authentication, authorization and accounting for subscribers coupled to different network elements within a network. In one embodiment, the database server 108 is a RADIUS server for storing this data regarding subscribers and the associated subscriber connections. In one embodiment, the network element 104 enables subscriber service selection over non-channelized media, as will be described in more detail below.

FIG. 1B illustrates a system 150 for routing data in an infrastructure for a cable environment. Similar to the system 100, the system 150 comprises the computing device 102, the network element 104, the database server 108 and the network 110. The system 150 also comprises a hybrid fiber coaxial cable (HFC) network 120 and a cable modem transmission system (CMTS) 122. As shown, the HFC network 120 is coupled to the computing device 102 and the CMTS 122. Additionally, the CMTS 122 is coupled to the network element 104. Accordingly, communications between the computing device 102 and the network element 104 are routed through the HFC network 120 and the CMTS 122.

In an embodiment, the HFC network 120 is a cable infrastructure that combines the radio frequency (RF) data communications of a number of computing devices 102 that are forwarded to the CMTS 122. In an embodiment, the CMTS converts the RF data communications into data packets, such as Internet Protocol (IP) packets, to be routed by the network element 104.

FIG. 1C illustrates a system 160 for routing data in an infrastructure for a DSL and Ethernet environment. Similar to the system 100, the system 160 comprises the computing device 102, the network element 104, the database server 108 and the network 110. The system 160 also comprises a Digital Subscriber Line Access Multiplexer (DLSAM) 124, an Asynchronous Transfer Mode (ATM) network 126 and a computing device 132.

As shown, the computing device 102 is coupled to the network 104 (via the subscriber connection 112) through the DSLAM 124 and the ATM network 126. The computing device 132 is coupled to the network element 104 through an Ethernet communications 134.

As is known in the art, the DSLAM 124 is a device within a network that combines a number of DSL communications into a single ATM transmission. The ATM network 126 comprises a number of communication links for routing data based on the ATM protocol. Accordingly, in an embodiment, the communications from the computing device 102 is received into the network element 104 as data based on the ATM protocol. Additionally, as shown, the computing device 132 and the network element 104 communicate based on the Ethernet protocol through Ethernet communications link 134. The operations of the systems illustrated in FIGS. 1A-1C will be described in more detail below.

Figure 2:
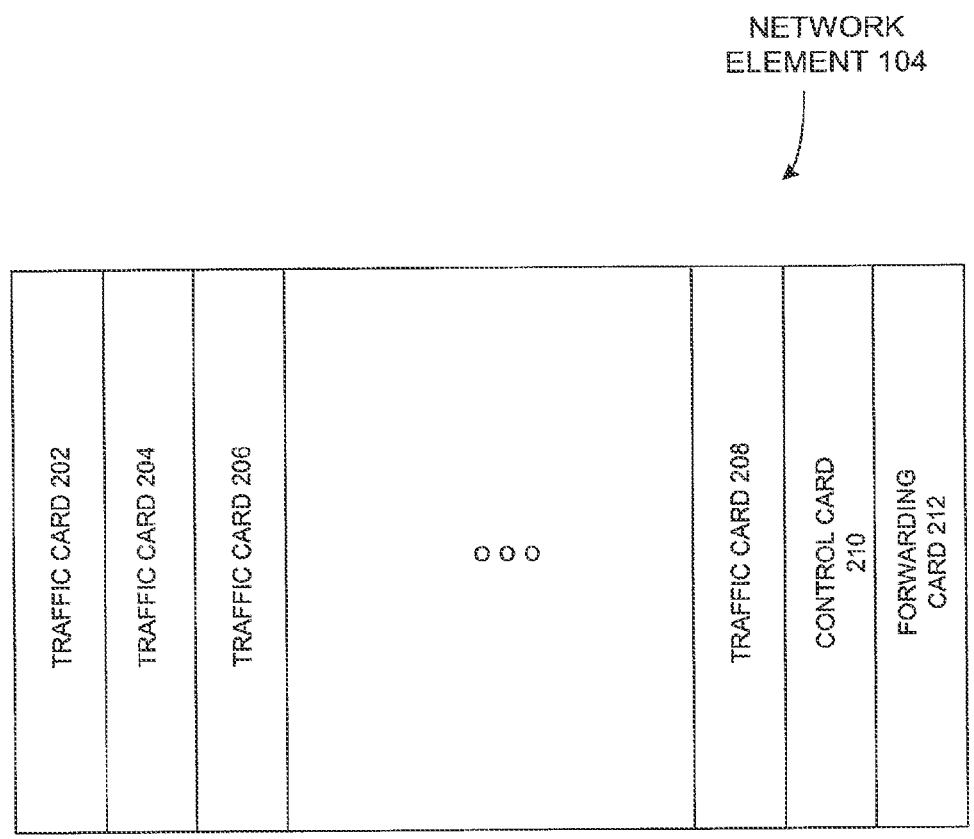
FIG. 2 illustrates a block diagram of a network element, according to an embodiment of the invention.

FIG. 2 illustrates a block diagram of a network element, according to an embodiment of the invention. In particular, FIG. 2 illustrates a more detailed block diagram of the network element 104. As shown, the network element 104 includes traffic cards 202-208. The network element 104 also includes a control card 210 and a forwarding card 212.

In an embodiment, each of the traffic cards 202-208 and the forwarding card 212 can include a processor and memory. Additionally, the control card 210 is described in more detail below in conjunction with FIG. 3. The traffic cards 202-208, the control card 210 and the forwarding card 212 are coupled to system buses. In an embodiment, the control card 210 performs control, system configuration and management tasks for the network element 104. For example, if the forwarding card 212 needs to be updated with a new Internet Protocol (IP) address table, such data is received by the control card 210 and transmitted to the forwarding card 212, wherein such data is updated therein.

Additionally, as will be described in more detail below, the control card 210 includes memory that stores addresses assigned and/or to be assigned to client devices coupled to the network element 104. For example, returning to FIGS. 1A-1C, when the client device 102 is attempting to couple to the network 110 through the network element 104, a series of communications are exchanged between the client device 102 and the network element 104 in order to assign an address to the client device 102 (as will be described in more detail below).

Moreover, the forwarding card 212 provides for buffering, packet processing and forwarding of data packets being received by the traffic cards 202-208. In particular, the traffic cards 202-208 can be coupled to a number of data transmission lines, which are coupled to other network elements and/or computing devices, as shown in FIG. 1. Accordingly, the traffic cards 202-208 receive and transmit data traffic from and to data transmission lines coupled thereto. Such data traffic is transmitted to the forwarding card 212, where this traffic can be buffered, processed and/or forwarded to other traffic cards within the network element 104, as will be described in more detail below.

The embodiment of the network element 104 is by way of example and not by way of limitation, as network elements having other architectural configurations can incorporate embodiments of the present invention. Examples of other network elements that could incorporate embodiments of the present invention could have multiple forwarding cards or have a single line card incorporating the functionality of both the forwarding and the controlling. Moreover, a network element having the forwarding functionality distributed across the traffic cards could incorporate embodiments of the present invention.

FIG. 3 illustrates a more detailed block diagram of a control card within a network element, according to one embodiment of the invention. In particular, FIG. 3 illustrates a more detailed block diagram of the control card 210 shown in FIG. 2. As shown, the control card 210 comprises a processor 310, a memory 320 and a control engine 302. The processor 310 is coupled to the control engine 302 and the memory 320. The control engine 302 is coupled to the memory 320.

The processor 310 may comprise any suitable processor architecture. The control card 210 for other embodiments may comprise more processors any of which may execute a set of instructions that are in accordance with embodiments of the invention.

Additionally, as shown, the memory 320 stores a number of addresses 306A-M. Addresses 306A-306I are those addresses for the subnet 340A, while addresses 306H-306M are those addresses for the subnet 340I. Accordingly, a subnet 340 can include one to a number of addresses. Additionally, as shown, the subnets 340A-340I are within contexts 350A-I. Accordingly, a context 350 can include one to a number of addresses 306.

In an embodiment, these addresses are source Internet Protocol (IP) addresses to be dynamically assigned to clients/subscribers that are coupled to the network element 104. The memory 320 may also store other data and/or instructions, for example, for the control card 210 and may comprise any suitable memory, such as a dynamic random access memory (DRAM) for example.

In an embodiment, the control engine 302 is a process or task that can reside within the memory 320 and/or the processor 310 and can be executed within the processor 310. However, embodiments of the invention are not so limited, as the control engine 302 can be different types of hardware (such as digital logic) executing the processing described therein (which is described in more detail below).

Accordingly, the control card 210 may include a machine-readable medium on which is stored a set of instructions (i.e., software) embodying any one, or all, of the methodologies described herein. For example, software can reside, completely or at least partially, within the memory 320 and/or within the processor 310.

The operations of subscriber service selection over a non-channelized media will now be described with reference to the block diagram of FIG. 4 and the flow diagram of FIG. 5. FIG. 4 illustrates a more detailed block diagram of a network element, database server and operations and communications therewith, according to one embodiment of the invention.

As shown, the network element 104 includes ports 420A-D, interfaces 422A-D and contexts 350A-I. Although FIG. 4 illustrates messaging and operations related to one port coupled to one interface of a context, in other embodiments, the different ports, interfaces and contexts of the network element 104 can include the messaging and operations illustrated. In an embodiment, a number of interfaces are associated with a given port. In another embodiment, a single interface is associated with a given port.

In an embodiment, contexts 350 are modules/units associated with a given service. For example in an embodiment, a given context 350 is associated with a given ISP. Accordingly, a given context 350 can include a number of subnets that comprise a number of addresses (e.g., Internet Protocol (IP) addresses) that are to be dynamically assigned to subscriber/clients that are coupled to the network element 104. To help illustrate, a first ISP could be associated with the context 350A, while a second ISP could be associated with the context 350I, etc.

The database server 108 comprises a number of subscriber records 450 and a number of subscriber accounting records 452. In an embodiment, a given customer premise equipment (CPE) coupled to the network element 104 has an associated subscriber record 450 and an associated subscriber accounting record 452. For example, a subscriber using client device 102 that is connecting to the network 110 through the network element 104 has an associated subscriber record 450 and an associated subscriber accounting record 452. While FIG. 4 illustrates the network element 104 and the database server 108 as two separate elements, embodiments of the invention are not so limited. For example, in another embodiment, the database server 108 and/or the records therein can be incorporated into the network element 104.

Additionally, as shown in FIG. 4, the network element 104 and the database server 108 are receiving and transmitting a number of different messages as well as performing a number of operations. The network element 104 is coupled to receive an address request message 402. The network element 104 is to transmit a request for context message 404 to the database server 108. The database server 108 is to transmit a bind to context message 406 back to the network element 104, in a response to this request. Additionally, the network element 104 performs a bind operation, (the bind to interface operation 408), to bind the assigned address for the given subscriber to the interface 422 for the context 350A. The network element 104 is to transmit a return address message 410 back to the client device 102. A more detailed description of these messages and operations is set forth below in conjunction with a flow diagram 500 of FIG. 5.

In particular, FIG. 5 is a flow diagram for providing subscriber service selection over a non-channelized media, according to one embodiment of the invention. The operation of the flow diagram 500 will be described with reference to the exemplary systems shown FIGS. 1-4.

In block 502, a request for an address from the client device 102 is received. With reference to the exemplary embodiment of FIG. 3, the control engine 302 receives this request. In an embodiment, the request includes an identifier of the client device 102. In one embodiment, the identifier of the client device 102 is the Media Access Control (MAC) Address of a customer premise equipment (such as the network card) within the client device 102 that is communicating with the network element 104. In an embodiment, the request is based on the Dynamic Host Configuration Protocol (DHCP), which allows for the assignment of Internet Protocol (IP) addresses to clients being coupled to a network, as is known in the art. In one such embodiment, the request from the client device 102 is a DHCP discover request, which is requesting an IP address from the network element 104. Returning to FIG. 4 to help illustrate, the address request message 402 is received into the network element 104 at the port 420A. This address request message 402 is being transmitted by the client device 102 (not shown in FIG. 4).

In block 504, a subscriber identifier is generated based on the client identifier. In an embodiment, the client identifier is converted into the subscriber identifier. With reference to the exemplary embodiment of FIG. 3, the control engine 302 generates this subscriber identifier. In an embodiment, the subscriber identifier is a username to be associated with this client device 102. In one embodiment, the subscriber identifier is a number of text characters that correspond to the client identifier. For example, in an embodiment wherein the client identifier is a MAC address, such as "112233445566" (which is comprised of 6 hexadecimal numbers having 12 hexadecimal nibbles), the control engine 302 generates the following text characters: "11:22:33:44:55:66", wherein each hexadecimal nibble is converted to a character that corresponds to the hexadecimal value (0-9 and A-F). However, embodiments of the invention are not so limited. For example, in other embodiments, the control engine 302 can generate a different subscriber identifier (based on the client identifier), using other operations, such as different ciphering operations, etc. To help illustrate, the control engine 302 could convert the hexadecimal values from the MAC address to a binary value and add a constant value to this binary value and convert the individual binary values into a corresponding text character.

In block 506, the context 350 for the subscriber (client) and associated subscriber attributes are retrieved. With reference to the exemplary embodiment of FIG. 3, the control engine 302 retrieves the context for the subscriber and the associated subscriber attributes. In one embodiment, the control engine 302 retrieves the context and the attributes from the database server 108, which stores a corresponding subscriber record 450 for this subscriber. In an embodiment, the control engine 302 transmits the subscriber identifier to the database server 108, wherein the database server 108 retrieves the context and the associated subscriber attributes from the subscriber record 450. Returning to FIG. 4 to help illustrate, the request for the context message 404 is transmitted from the network element 104 to the database server 108. The database server 108 transmits the bind to context message 406 back to the control engine 302.

In an embodiment, when the client device 102 initially communicates with the network element 104, the database server 108 will not include a corresponding subscriber record 450. Accordingly, if the database server 108 does not return a corresponding subscriber record 450, the control engine 302 causes the client device 102 to execute an initiation process, wherein the client device 102 provides data to be entered into the subscriber record 450. In an embodiment, the control engine 302 redirects the client device 102 to a web site for activating a subscriber account, wherein the different subscriber attributes, such as the ISP, the data rates (rate limiting and policing values), the access control lists, etc. are selected. Accordingly, the control engine 302 can retrieve the context 350 for this subscriber once the subscriber account has been established. In an embodiment, when the client device 102 requests a domain name service, the control engine 302 generates a response back to the client device 102 that includes a redirect message. Accordingly, this redirect message could be processed by a web site (described above) for activating the subscriber account. Accordingly, such a process reduces the opportunity for a new subscriber to provide fraudulent, false or incomplete data during an account subscription.

In block 508, an address is assigned to the subscriber based on the context 350. With reference to the exemplary embodiment of FIG. 3, the control engine 302 assigns an address to the subscriber based on the context 350. As described above, a given context 350 can comprise a number of subnets that can comprise a number of addresses. Returning to FIG. 3, assuming that the context for this subscriber is associated with the addresses for context 350, the control engine 302 selects one of the addresses 306 from one of the addresses of subnets 340A-M, which is not currently assigned, for assignment to the current subscriber.

In block 510, a virtual circuit is generated between the client device 102 and the network element 104. With reference to the exemplary embodiment of FIG. 3, the control engine 302 generates this virtual circuit between the client device 102 and the network element 104. In one embodiment, a given subscriber session has a one-to-one correspondence to a given virtual circuit. In one embodiment, a given transmission line (a real circuit) can include a number of virtual circuits. In particular, when the client device 102 is assigned an address for this given subscriber session, data packets received and transmitted from the client device 102 include this address in order to associate the data packets with the subscriber session (and therefore the associated virtual circuit). Returning to FIG. 4 to help illustrate, in conjunction with the creation of the virtual circuit, the control engine 302 binds the address to the interface 422, as illustrated by the bind to interface operation 408. Additionally, as shown in FIG. 4, as part of the generation of the virtual circuit, the control engine 302 returns the requested address back to the client device 102, as illustrated by the return address message 410.

In an embodiment wherein the DHCP protocol is employed for the assignment of the address, the control engine 302 generates an DHCP offer request that is transmitted back to the requesting client device 102. In turn, if the client device 102 accepts the address, the client device 102 transmits a request back to the network element 104. The control engine 302 transmits back an acknowledge of this acceptance.

In block 512, the account for the subscriber is updated. With reference to the exemplary embodiment of FIG. 3, the control engine 302 updates the account for the subscriber. In an embodiment, the control engine 302 generates an accounting message that indicates that there is an active subscriber session associated with this given subscriber, identified by the subscriber identifier (described above). The control engine 302 transmits this account message to the database server 108. Returning to FIG. 4 to help illustrate, the control engine 302 transmits this account update (update accounting message 412) to the database server 108. Accordingly, the database server 108 updates the corresponding subscriber accounting record 452. Additionally, although described such that the database server 108 updates a given subscriber accounting record 452, in a different embodiment, the database server 108 includes a log file such that modifications to a given subscriber account is appended to the log file. In another embodiment, instead of updating the account for the subscriber, these updates to the account are transmitted to the database server 108 as part of periodic updates for given subscriber accounts.

The servers as well as the traffic cards, forwarding cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes non-transitory machine readable storage media (e.g., read only memery (ROM); random devices); machine readable transmission media (e.g., electrical, optical, acoustical or other form of propagated signals (e.g., carrier waves, infrared signals, digital signals, etc.)); etc.

Thus, a method and apparatus for enabling subscriber service selection over non-channelized media have been described. Although the present invention has been described with reference to specific exemplary embodiments, it will be evident that various modifications and changes may be made to these embodiments without departing from the broader spirit and scope of the invention. For example, while embodiments of the invention are described such that a separate database server is coupled to store data related to subscriber connections. In other embodiments, such data can be stored within the network element 104. Accordingly, the specification and drawings are to be regarded in an illustrative rather than a restrictive sense.

What is claimed is:

1. A method performed by a network element for authentication, authorization, and accounting based on a username, the method comprising:
   receiving a request at the network element from a client device for an Internet Protocol (IP) address, the request including an identifier that is not provided as the username, wherein the network element includes a processor and memory;
   automatically generating by the network element the username based on the identifier;
   retrieving, based on the username automatically generated by the network element, a context for the client device from a record in a subscriber records database, wherein the context is associated with a service;
   dynamically assigning to the client device from the context an IP address that is not currently assigned from the context; and
   causing an accounting update to reflect an active subscriber session based on the assigned IP address.

2. The method of claim 1, wherein the identifier includes a Media Access Control (MAC) address, and wherein the username comprises a number of text characters corresponding to the MAC address and a number of additional characters.

3. The method of claim 2, wherein the MAC address is that of the client device's network card.

4. The method of claim 1, wherein wireless concentrators route data from the client device to the network element.

5. The method of claim 1, wherein the client device is coupled to the network element via a cable modem service over a Radio Frequency (RF) cable line.

6. The method of claim 1, wherein the client device and network element are coupled via a hybrid fiber-coaxial (HFC) network coupled to a cable model transmission system (CMTS).

7. The method of claim 1, wherein the client device and network element are coupled via a Digital Subscriber Line (DSL) through a DSL Access Mulitplexer (DSLAM) and Asynchronous Transfer Mode (ATM) network.

8. The method of claim 1, wherein the client device and network element are coupled via an Ethernet communications link.

9. The method of claim 1, wherein the retrieving also includes:
   retrieving from the record a data rate attribute.

10. The method of claim 1, wherein the step of retrieving the context further comprising:
    accessing the record from a subscriber records database incorporated into the network element.

11. The method of claim 1, wherein the step of retrieving the context further comprising:
    transmitting a request to a database server storing the record in a subscriber records database.

12. The method of claim 11, wherein the database server stores data related to authentication, authorization and accounting (AAA) for subscribers.

13. The method of claim 11, wherein the database server is a RADIUS server.

14. The method of claim 11, wherein the step of causing the accounting update includes:
    transmitting the accounting update to the database server.

15. The method of claim 1 further comprising:
    after said automatically generating and before said dynamically assigning, redirecting the client device to a website to allow for a selection of a service from multiple services, wherein different contexts within the network element are associated with different services, wherein the context for the selected service is entered into the record, wherein the record is accessible according to the username.

16. The method of claim 15, wherein the step of receiving includes receiving the request from the client device over non-channelized media.

17. A method performed by a network element for authentication, authorization, and accounting based on a username, the method comprising:
receiving a request at the network element from a client device for an Internet Protocol (IP) address, the request including an identifier that is not provided as the username and that is a Media Access Control (MAC) address, wherein the network element includes a processor and memory;
transmitting a request to a RADIUS server, wherein the request includes as the username a subscriber identifier automatically generated by the network element based on the identifier, wherein the automatically generating includes at least adding characters to the identifier;
receiving a response from the RADIUS server;
if the request is an initial communication by the client device with the network element, redirecting the client device to a website to allow for a selection of a service from multiple services, wherein different contexts within the network element are associated with different services, wherein the context for the selected service is entered into a subscriber record that is accessible according to the username and that is stored in the RADIUS server;
dynamically assigning to the client device from the context identified by the subscriber record an IP address that is not currently assigned from that context;
establishing an active subscriber session for the client device; and
causing an accounting update to reflect the active subscriber session.

18. The method of claim 17, further comprising:
establishing a virtual circuit with the client device, the establishing including binding the IP address to an interface of the context.

19. The method of claim 17, wherein the username comprises the added characters and a number of text characters corresponding to the MAC address.

20. The method of claim 19, wherein the MAC address is that of the client device's network card.

21. The method of claim 17, wherein wireless concentrators route data from the client device to the network element.

22. The method of claim 17, wherein the client device is coupled to the network element via a cable modem service over a Radio Frequency (RF) cable line.

23. The method of claim 17, wherein the client device and network element are coupled via a hybrid fiber-coaxial (HFC) network coupled to a cable model transmission system (CMTS).

24. The method of claim 17, wherein the client device and network element are coupled via a Digital Subscriber Line (DSL) through a DSL Access Mulitplexer (DSLAM) and Asynchronous Transfer Mode (ATM) network.

25. The method of claim 17, wherein the client device and network element are coupled via an Ethernet communications link.

26. The method of claim 17, wherein the response includes a data rate attribute.

27. The method of claim 17, wherein the step of causing the accounting update includes:
transmitting the accounting update to the RADIUS server.

28. The method of claim 17, wherein automatically generating the username includes:
converting hexadecimal values from the MAC address to a binary value;
adding a constant value to the binary value; and
converting the binary value into a text character.

29. The method of claim 17, wherein the request is a DHCP discover request, wherein the identifier is a MAC address, and wherein the subscriber records database is stored in a RADIUS server.

30. A network element to cause authentication, authorization and accounting based on a username, the network element comprising:
a traffic card including a port to be coupled to a client device to receive a request from the client device for an Internet Protocol (IP) address, the request including an identifier that is not provided as the username;
a control card including a control engine with logic to,
automatically generate the username based on the identifier;
retrieve, based on the username automatically generated by the network element, a context for the client device from a record in a subscriber records database, wherein the context is associated with a service;
dynamically assign to the client device from the context an IP address that is not currently assigned from the context; and
cause an accounting update to reflect an active subscriber session based on the assigned IP address.

31. The network element of claim 30, wherein the identifier includes a Media Access Control (MAC) address, and wherein the username comprises a number of text characters corresponding to the MAC address and a number of additional characters.

32. The network element of claim 31, wherein the MAC address is that of the client device's network card.

33. The network element of claim 30, wherein the port is to be coupled to the client device through a wireless concentrator.

34. The network element of claim 30, wherein the port is to be coupled to the client device through a cable modem service over a Radio Frequency (RF) cable line.

35. The network element of claim 30, wherein the port is to be coupled to the client device through a hybrid fiber-coaxial (HFC) network coupled to a cable model transmission system (CMTS).

36. The network element of claim 30, wherein the port is to be coupled to the client device via a Digital Subscriber Line (DSL) through a DSL Access Mulitplexer (DSLAM) and Asynchronous Transfer Mode (ATM) network.

37. The network element of claim 30, wherein the port is to be coupled to the client device through an Ethernet communications link.

38. The network element of claim 30, wherein the retrieval also includes retrieval from the record a data rate attribute.

39. The network element of claim 30, wherein the retrieval also includes the record being accessed from a subscriber records database incorporated into the network element.

40. The network element of claim 30, wherein the retrieval includes transmission of a request to a database server storing the record in a subscriber records database.

41. The network element of claim 40, wherein the database server stores data related to authentication, authorization and accounting (AAA) for subscribers.

42. The network element of claim 40, wherein the database server is a RADIUS server.

43. The network element of claim 40, wherein the accounting update is caused by the transmission of the accounting update to the database server.

44. The network element of claim 30, wherein the control engine is also configurable to:
after said automatically generating and before said dynamically assigning, redirect the client device to a website to allow for a selection of a service from multiple services, wherein different contexts within the network element are associated with different services, wherein the context for the selected service is entered into the record, wherein the record is accessible according to the username.

45. The network element of claim 44, wherein the receipt of the request from the client device is over non-channelized media.

46. A network element to cause authentication, authorization and accounting based on a username, the network element comprising:
a traffic card including a port to be coupled to a client device to receive a request from the client device for an Internet Protocol (IP) address, the request including an identifier that is not provided as the username and that is a Media Access Control (MAC) address;
a control card including a control engine with logic to,
transmit a request to a RADIUS server, wherein the request includes as the username a subscriber identifier automatically generated by the network element based on the identifier, wherein the automatic generation includes at least adding characters to the identifier;
receive a response from the RADIUS server;
if the request is an initial communication by the client device with the network element, redirect the client device to a website to allow for a selection of a service from multiple services, wherein different contexts within the network element are associated with the-different services, wherein the context for the selected service is entered into a subscriber record that is accessible according to the username and that is stored in the RADIUS server;
dynamically assign to the client device from the context identified by the subscriber record an IP address that is not currently assigned from that context;
establish an active subscriber session for the client device; and
cause an accounting update to reflect the active subscriber session.

47. The network element of claim 46, wherein the logic of the control engine is also to:
establish a virtual circuit with the client device, the establishment including the IP address being bound to an interface of the context.

48. The network element of claim 46, wherein the username comprises the added characters and a number of text characters corresponding to the MAC address.

49. The network element of claim 48, wherein the MAC address is that of the client device's network card.

50. The network element of claim 46, wherein the port is to be coupled to the client device through a wireless concentrator.

51. The network element of claim 46, wherein the port is to be coupled to the client device through a cable modem service over a Radio Frequency (RF) cable line.

52. The network element of claim 46, wherein the port is to be coupled to the client device through a hybrid fiber-coaxial (HFC) network coupled to a cable model transmission system (CMTS).

53. The network element of claim 46, wherein the port is to be coupled to the client device via a Digital Subscriber Line (DSL) through a DSL Access Mulitplexer (DSLAM) and Asynchronous Transfer Mode (ATM) network.

54. The network element of claim 46, wherein the port is to be coupled to the client device via an Ethernet communications link.

55. The network element of claim 46, wherein the response includes a data rate attribute.

56. The network element of claim 46, wherein the accounting update is caused by the transmission of the accounting update to the RADIUS server.

* * * * *

UNITED STATES PATENT AND TRADEMARK OFFICE
CERTIFICATE OF CORRECTION

| | | |
|---|---|---|
| PATENT NO. | : 9,319,235 B2 | Page 1 of 1 |
| APPLICATION NO. | : 13/032624 | |
| DATED | : April 19, 2016 | |
| INVENTOR(S) | : Kilfoyle et al. | |

It is certified that error appears in the above-identified patent and that said Letters Patent is hereby corrected as shown below:

TITLE PAGE

On Page 2, in item (56), under "FOREIGN PATENT DOCUMENTS", in Column 1, Line 10, delete "11/2003" and insert -- 12/2003 --, therefor.

IN THE SPECIFICATION

In Column 1, Line 10, delete "2002," and insert -- 2002, now Pat. No. 7,895,304, --, therefor.

In Column 4, Lines 61-62, delete "Digital Subscriber Line Access Multiplexer (DLSAM)" and insert -- Digital Subscriber Line Access Multiplexer (DSLAM) --, therefor.

In Column 6, Lines 63-64, delete "context 3501," and insert -- context 350I, --, therefor.

In Column 9, Line 54, delete "memery (ROM); random devices);" and insert -- memory (ROM); random access memory (RAM); magnetic disk storage media; optical storage media; flash memory devices); --, therefor.

Signed and Sealed this
Nineteenth Day of July, 2016

Michelle K. Lee
*Director of the United States Patent and Trademark Office*